Figure 1:
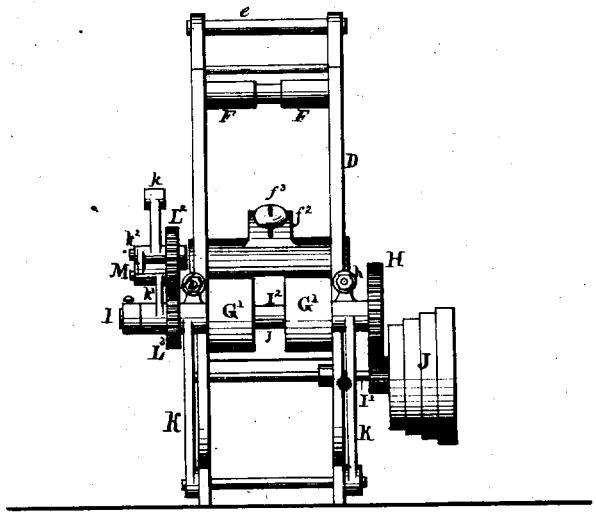

2 Sheets--Sheet 1.

R. EICKEMEYER.

Fulling-Mills.

No. 6,358.

Reissued March 30, 1875.

*Witnesses:*

E. L. Renwick

W. H. Isaacs

*Inventor:*

Rudolf Eickemeyer

THE GRAPHIC CO. PHOTO-LITH. 39 & 41 PARK PLACE, N.Y.

2 Sheets--Sheet 2.

R. EICKEMEYER.

Fulling-Mills.

No. 6,358. Reissued March 30, 1875.

*Witnesses:*

E. L. Renwick
W. H. Baacke

*Inventor:*

Rudolf Eickemeyer

THE GRAPHIC CO. PHOTO-LITH. 39 & 41 PARK PLACE, N.Y.

UNITED STATES PATENT OFFICE.

RUDOLF EICKEMEYER, OF YONKERS, NEW YORK, ASSIGNOR TO EICKEMEYER FELTING COMPANY.

IMPROVEMENT IN FULLING-MILLS.

Specification forming part of Letters Patent No. 144,841, dated November 25, 1873; reissue No. 6,358, dated March 30, 1875; application filed May 9, 1874.

*To all whom it may concern:*

Be it known that I, RUDOLF EICKEMEYER, of Yonkers, in the county of Westchester and State of New York, have made an invention of certain new and useful Improvements in the Art of Fulling Hat-Bodies and other articles, and that the following is a full, clear, and exact description and specification of the same.

The object of the invention is to enable fur-hat bodies to be felted or sized by machinery with rapidity and success. The objects of the invention are, further, to prevent the articles upon which the fulling-mill is operating from moving too easily under the blows of the fulling-stocks; to enable the resistance opposed to such movement to be regulated with facility; to enable the speed of the fulling-stocks to be changed; to enable the fall of the fulling-stocks to be adjusted with facility, so as to vary the force of the blows, and to enable the fulling-stocks, when set to a particular lift, to be raised the same distance from the articles on which they are operating, however the positions of such articles in the bed may vary. To these ends my invention consists of certain combinations of devices which are specified in detail at the close of this schedule, and some of which may be used separately from others, as found expedient.

The principal members of these combinations are the following, viz: A fulling-stock, consisting substantially of a beater, which is constructed to move to and fro, so as to strike the articles and withdraw from them in alternate succession; an adjustable fulling-bed, having an adjustable apron, or some equivalent therefor, by means of which the concave space in which the articles to be fulled lie, may be made more or less confined, so as to vary the resistance opposed to their movement under the blows of the fulling-stock; adjustable moving mechanism for moving the fulling-stock to different distances, so as to vary the force of the blow imparted by it. This adjustable raising or moving mechanism may be constructed in various modes, but that which I prefer consists of a strap and two griping-rollers, as hereinafter more fully described. Springs for causing the griping-surfaces to bear against the strap with a yielding pressure; mechanism for varying the speed of movement of the fulling-stock, so that the speed may be rapid when the extent of movement is small, and may be decreased when the extent of movement is increased. Various variable mechanism may be used for this purpose, but that which I prefer is a cone-pulley having several grades, to one or other of which the driving-belt may be transferred, a similar but converse cone-pulley being applied to the counter-shaft, from which the driving-belt derives its movement.

In order that the invention may be fully understood, I have represented in the accompanying drawing, and will proceed to describe, an improved fulling-mill embodying my improvements in the best form known to me at the date of my application for the original patent.

Figure 4:
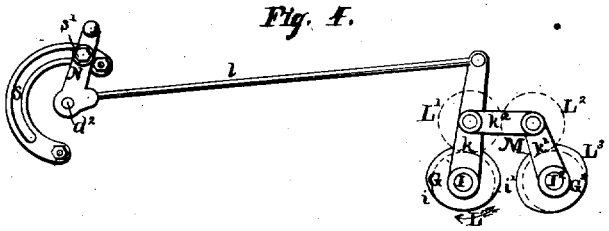
Figure 3:
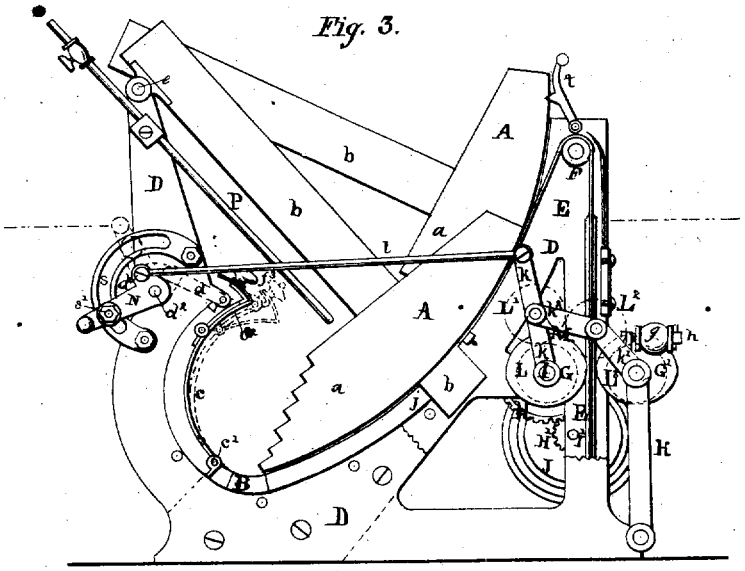
Figure 2:
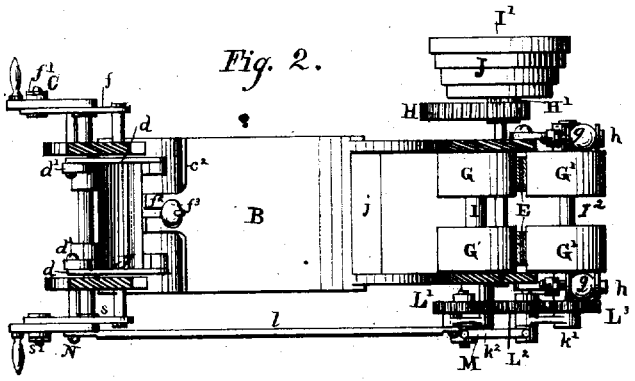

Figure 1 in said drawings represents an end view of the said fulling-mill with some portions removed. Fig. 2 represents a top view of the same with portions removed. Fig. 3 represents a side view of the same. Fig. 4 represents a view of certain parts of the machine, designated by the same letters as the same parts in the other figures.

The fulling-mill represented in the said drawings has two fulling-stocks, A A, and a curved adjustable bed, B, to hold the articles while the fulling-stocks are operating upon them. When the mill is in use the bed is inclosed in the usual manner by sides, which are not shown in the drawing. The fulling-stocks, in this instance, are constructed in the usual manner, each consisting of a beater, *a*, which is connected by a helve, *b*, with a frame, D, the helve being pivoted to the frame, as at *e*, so that the fulling-stocks may be raised and may fall in circular arcs. The adjustable fulling-bed is constructed with a movable apron, *c*, which is connected with the residue of the bed by means of a hinge, $c^1$, so that the said apron may be set more or less forward to vary the area of the concave space in which the articles are confined. In order that the adjustment of the bed may be effected with facility, the upper side of the said apron *c* is connected by two links, *d*, with the arms $d^1$ of a rock-shaft, $d^2$, which is supported in suitable bearings connected with the frame of the fulling-mill, and is fitted at one end with a crank-arm, C, by means of which it may be readily rocked to move the upper end of the apron outward or inward. In order that the apron may be secured in any position to which it may be adjusted, a slotted segment, $f$, is made fast to the frame D, and a clamp-screw and nut, $f^1$, are provided to clamp the crank-arm C to the said segment, so as to secure it, and thereby fix the positions of the rock-shaft, its arms, and the apron connected with the said arm. In order to confine the articles more closely than can be effected by the adjustment of the apron alone, and thereby oppose a greater resistance to their movements when necessary, the upper part or tip $c^2$ of the apron $c$, is made adjustable relatively to the main portion thereof. To this end the said tip $c^2$ is hinged to the apron $c$, so that it may be set forward, as represented by the dotted lines in Fig. 3; and it is connected with the apron by means of a slotted bar $f^2$, and clamp-screw and nut $f^3$, so that the tip may be secured in any position to which it may be adjusted.

The fulling-stocks A in the said fulling-mill are raised by the following means: Each fulling-stock is fitted with a strap, E, which ascends and passes over a pulley, F, secured to the frame of the machine, and thence descends between a set of two griping-collars, G G′. The descending portion of each strap is thickened, as seen edgewise in Fig. 3. One of these griping-rollers, G, is secured to a shaft, I, which is arranged to revolve in bearings secured to the main frame D, and is fitted at its end with a cog-wheel, H, whose teeth engage with those of a pinion, H′, secured to the counter-shaft $I^1$, and this counter-shaft is fitted with a set of cone-pulleys, J, for the driving-belt. The second griping-roller G′ of each set is secured to a shaft, $I^2$, which is supported in bearings secured to a swinging frame, K, which is pressed toward the shaft I of the first griping-rollers G by means of springs $g$; the said springs being, in this instance, india-rubber springs, and being slipped over tie-bolts $h$, which are pivoted to the main frame, and pass through holes in the upper ends of the arms of the swinging frame K. By means of these springs the surfaces of the griping-rollers are held against the strap with a yielding pressure and enabled to gripe strongly the strap between them, with the capacity of adapting themselves to inequalities in the thickness of the strap, or its diminution in thickness by wear.

The second griping-roller G′ of each set, is caused to revolve simultaneously with the first, by connecting the two roller shafts I $I^2$ by means of the cog-wheels L $L^1$ $L^2$ $L^3$, whose positions are represented in dotted lines in Figs. 3 and 4. The griping-rollers G $G^1$ are partially eccentric, a portion of the barrel of each extending from $i$ to $i'$, in the direction of the arrows in Fig, 4, being concentric, and the residue, from $i'$ to $i$ in the same direction, being eccentric, or of less diameter than the concentric portion; hence, when the two rollers of a set are caused to revolve simultaneously in opposite directions, and the two are arranged so that their concentric barrels simultaneously act upon opposite sides of the strap E, as seen at Fig. 3, the two gripe the straps between them, and, pulling it downward, raise the fulling-stock until the eccentric portions of the rollers come opposite each other. As these eccentric portions are separated by a space that is wider than the thickness of the strap, the rollers then cease to gripe the strap, thus releasing it, and permitting the fulling-stock with which the strap is connected to fall by gravitation. Each revolution of the set of griping-rollers thus causes the fulling-stock to rise, and permits its descent; and as the rollers of the two sets are arranged with their eccentric portions diametrically apart, the two fulling-stocks are caused to rise and permitted to fall in succession. The fulling-stock, in falling, draws the strap upward between the griping-rollers until the fall is arrested by the articles in the bed B, or by the contact with the outer end of the helve with the stop $j$; whereupon the upward movement of the strap between the griping-rollers stops, and the strap remains ready to be griped by the opposing eccentric portions of the griping-rollers in their revolution; but, as the position of the fulling-stock does not affect the time during which the griping-rollers act upon the strap, the fulling-stock is moved to the same distance, whether it starts from the same place in the bed or not, which is a result that has not been attained by the old system of lifting fulling-stocks by means of revolving wipers.

In fulling hat-bodies according to my invention, the force of the blow of the fulling-stock, and consequently the distance to which it is raised in order to fall with force, is varied as the fulling proceeds, the said articles being able to sustain progressively more forcible blows as their substance becomes hardened by fulling. In order that the distance to which the fulling-stocks are raised may be varied, so as to vary the force of the blows and complete the process in the same fulling-mill in which it is commenced, the raising mechanism for raising the fulling-stocks is constructed so as to be adjustable.

The construction which I prefer for this purpose is as follows: The connecting-wheels $L^1$ $L^2$ are pivoted to a movable frame, M, composed of two arms, $k$ $k^1$, and a link, $k^2$. One of these arms is arranged to swing upon the adjacent roller-shaft I as a center, and the other arm $k^1$ upon the other roller-shaft in like manner, and the two arms are connected by the link $k^2$; consequently the connecting-wheels $L^1$ $L^2$ may be moved relatively to the wheels L $L^3$ upon the roller-shafts without the teeth becoming disengaged, and the effect of this movement is to change the angular positions of the wheels relatively to each other.

As the wheels maintain their engagement during such movement, the change in the angular positions of the wheels changes the relative positions of the concentric portions of the barrels of the two griping-rollers of each set; and, if the two rollers be in the relative angular positions represented at Fig. 3, when the connecting-wheels and the frame M have the positions therein represented, the movement of the connecting-wheels $L^1$ $L^2$ to the right hand partially turns the shaft $I^2$ of the second griping-roller G′ relative to the first $I^1$, as seen in Fig. 4, and consequently causes a part of the eccentric portion of the second griping-roller G′ to oppose the concentric portion of the first griping-roller G; hence, the pressure upon the strap will be released sooner than when the griping-rollers and connecting-wheels occupy the relative positions represented in Fig. 3, and consequently the fulling-stock will not be raised as high as before. The extent of lift of the fulling-stocks, and consequently the force of the blows, may thus be readily varied by the movement of the adjusting-frame M, and, in order that such movement may be readily effected, one of the arms *k* of that frame is prolonged, and is connected by a rod, *l*, with a lever, N, which is pivoted upon the end of the shaft $d^2$. The longer arm of this lever forms a hand-lever for moving the adjusting-frame M, and the latter may be secured in any desired position in which it may be adjusted by fastening the hand-lever by means of the slotted segments *s*, and clamp-screw and nut *s′*.

In order that the articles in the mill may be sprinkled or steamed, so as to moisten them, a perforated pipe, P, is provided, one of its arms being connected by a stop-cock with a pipe leading from a steam-boiler, and the other arm being connected in like manner with a supply of water. The fulling-mill also is provided with gags *t*, for catching and holding the fulling-stocks when their movements are to be arrested.

The combination of the raising mechanism of the fulling-stock with a cone-pulley, J, enables the speed with which the stocks are raised to be varied, so as to effect a great saving of time. Thus, when the articles are first charged into the mill, the adjustable raising mechanism is so set as to raise the fulling-stocks but a short distance; hence, at this period, the blows may be made with great rapidity. As the work proceeds, the adjustable raising mechanism may be adjusted to raise the fulling-stocks higher; consequently they must be operated more slowly, and this is readily accomplished by shifting the driving belt to a larger pulley-grade.

If the raising mechanism were driven only at one speed, as is the customary arrangement with the ordinary fulling-mills, the speed could be only that which can be used with the greatest lift of the stocks, and consequently, when the stocks are lifted but little, they would remain at rest for considerable periods before they were again raised, and much time would be lost.

The combination in the same fulling-mill of the adjustable bed and the adjustable raising mechanism for the fulling-stocks is of great practical value, as it enables the movement of the articles being fulled to be resisted as the blows of the fulling-stocks become more forcible, and prevents the articles from escaping from the fulling-stocks more rapidly than is desirable for rapid work.

In operating upon fur-hat bodies with the above-described mill, the fulling-stocks are first adjusted to fall about six inches and the apron of the mill and the tip thereof are opened to the greatest extent. The hat-bodies, previously slightly hardened by hand and soaked with hot water, are rolled up singly, are charged into the mill, and the fulling-stocks are set in motion so as to subject the hat-bodies to the action of the percussive force incident to the blows of the stocks. The work is continued until the sides of the hat-bodies begin to felt together, which generally occurs in from fifteen to twenty minutes; whereupon they are taken out, opened, crossed, rolled up, and reinserted in the mill. The lift of the fulling-stocks may then be raised to nine inches, so as to increase the percussive force to which the hat-bodies are subjected. As the fulling of the hat-bodies progresses the lift may be raised gradually or step by step to the highest which it is expedient to use, which is generally eighteen inches. During the operation the hat-bodies are kept as wet as it is possible to keep them, by hot water confined by the sides and bed of the mill. Whenever, during the fulling, the sides of the hat-bodies show signs of sticking together, they should be opened, crossed, and rolled up again. Usually four graduations of the lift of the fulling-stocks—say—six, nine, twelve, and eighteen inches—are sufficient to make the required graduated increase of the percussive force, and during the last two the apron may, with advantage, be gradually closed, and during the last one the tip of the apron also may be closed in.

I claim as my invention—

1. The combination, substantially as before set forth, of the adjustable tip and the adjustable apron of the bed of the fulling-mill.

2. The combination, substantially as before set forth, of the fulling-stock with adjustable raising mechanism, which is adjustable to vary the distance to which the fulling-stock is raised, so that the force of the blow can be varied as the fulling progresses.

3. The combination, substantially as before set forth, of the adjustable bed for the fulling-mill, the fulling-stock, and the adjustable raising mechanism for the fulling-stock, so that the resistance to the movement of the articles may be increased when the force of the blow is increased.

4. The combination, substantially as before set forth, of the fulling-stock, the adjustable raising mechanism therefor, and the cone-pulley for varying the number of strokes of the fulling-stock in a given time.

5. The combination, substantially as before set forth, of the fulling-stock, the raising-strap, and the griping-rollers.

6. The combination, substantially as before set forth, of the raising-strap, the eccentric griping-rollers, and the adjusting mechanism for varying the relative angular positions of said rollers, so as to vary the time during which they operate upon the raising-strap.

7. The combination, substantially as before set forth, of the fulling-stock, the raising-strap, the griping-surfaces which operate on said strap, and the springs which cause one of said griping surfaces to bear against said strap with a yielding pressure.

RUDOLF EICKEMEYER.

Witnesses:
E. S. RENWICK,
W. H. ISAACS.